Sept. 4, 1951     R. C. WRIGHT     2,566,690
SHEAR PIN
Filed Nov. 26, 1946
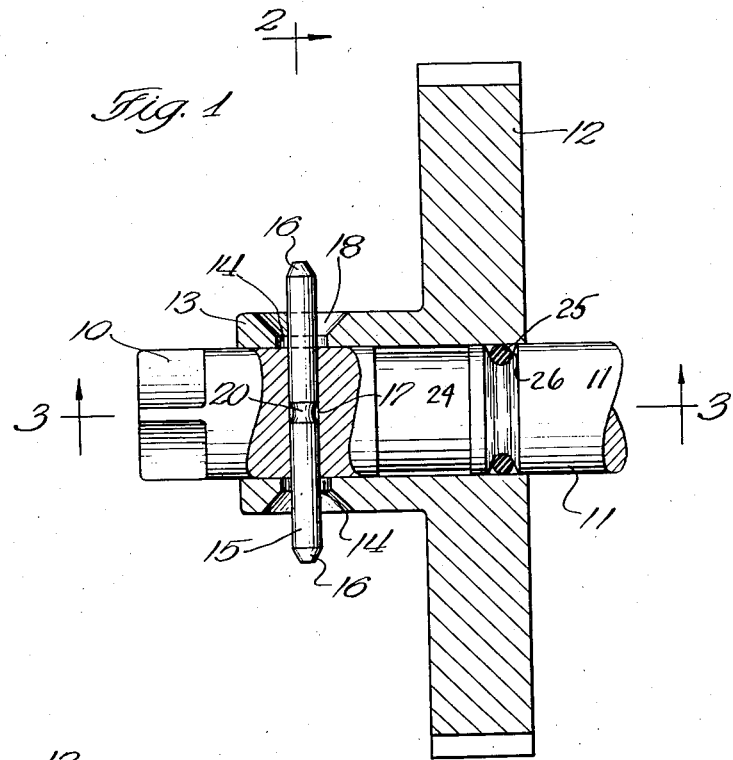
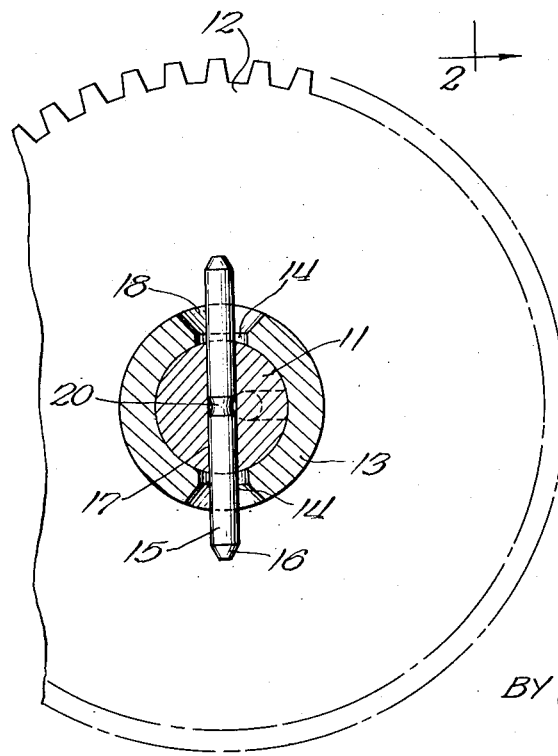
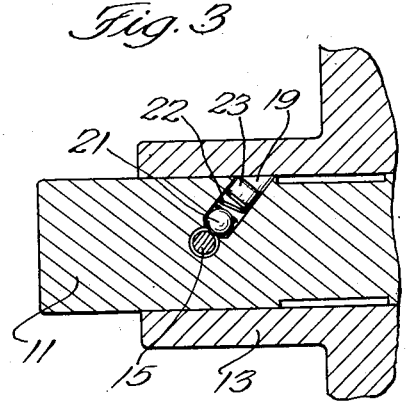
INVENTOR
Richard C. Wright
BY
ATTORNEY Patented Sept. 4, 1951

2,566,690

UNITED STATES PATENT OFFICE 2,566,690

SHEAR PIN

Richard C. Wright, Bay Village, Ohio, assignor to Iron Fireman Manufacturing Company, Portland, Oreg.

Application November 26, 1946, Serial No. 712,394

1 Claim. (Cl. 64—28)

This invention relates generally to the stoker industry and particularly to an inexpensive and convenient form of shear pin, whereby the driving connection between the prime mover and the coal feeding worm may be rendered inoperative by an overload on the worm, and whereby an operative condition may be easily restored without the use of special tools or the exercise of skill not possessed by the average person.

The main object of this invention is to so construct a device that no delicate or intricate parts are required.

I accomplish these and other objects in a manner set forth in the following specification as illustrated in the accompanying drawing, in which:

Fig. 1 is a longitudinal section through a representative form of worm shaft end and its driving gear.

Fig. 2 is a section taken along the line 2—2 of Fig. 1.

Fig. 3 is a fragmentary section taken along the line 3—3 in Fig. 1.

Similar numbers of reference refer to the same or similar parts throughout the several views.

Referring in detail to the drawing, there is shown the square end 10, of a worm shaft 11, upon which is mounted a drive gear 12, through whose hub 13, extends the holes 14, for the shear pin 15, which is preferably somewhat longer than the diameter of the hub 13, and provided with tapered ends 16, to facilitate the insertion of the shear pin 15, into the holes 14, as well as into the hole 17, formed through the diameter of the shaft 11. It will be noted that the holes 14 are preferably somewhat larger in diameter than is the hole 17 and there are formed countersunk portions 18, the purposes of which are to provide a better visibility of the hole 17, and also to render the alignment of the various holes more easily obtainable.

The pin 15, is provided with a groove 20, about the circumference thereof, midway between its ends 16.

The shaft 11, is also provided with an inclined hole 19, which is pointed toward the axis of the shaft 11, and intersects the hole 17, but is not delivered entirely through same as shown in Fig. 3.

A ball 21, is placed in the hole 19, and is urged toward the hole 17, by means of a spring 22, which is held in place by the plug 23, which may be threaded through the hole 19, or merely pressed therein.

It will be noted in Fig. 3 that the ball 21, engages the groove 20, in the pin 15, thereby preventing it from falling out of the hole 17, and requiring it to be manually forced up.

The purpose of inclining the hole 19, is to move its outer end away from the transverse plane passing through the hole 17, in order to avoid the mistaken attempt in driving the plug 23, instead of driving the shear pin 15.

Again it can be seen that when the pin 15, is entirely removed the ball 21 cannot escape into the opening 14.

It will be noted that the ends 16, of the pin 15, are somewhat pointed. This not only assists in inserting the pin in the holes 14 and 17, but also serves to push the ball 21, out of the way when inserting the pin 15.

While the pin 15, is illustrated as having an encircling groove 20, this groove is by no means necessary and in some cases is objectionable, dependence being placed upon the friction produced by the thrust from the ball 21.

It will be noted that the diameter of the shaft portion 24, has been reduced slightly throughout a portion of the length of its engagement with the hub 13. This has been done to reduce the total bearing area in contact so as to reduce the tendency for seizing to take place when the pin 15 is sheared, and also provides a storage space for lubricant to further prevent seizing.

It is also desirable to provide an O ring seal 25, between the members 11 and 13 which is used to prevent the escape of oil from the gear case. This seal makes it possible to eliminate the external cap which was required with our older construction for the purpose of preventing the escape of lubricant.

The O ring seal 25 is a synthetic rubber sealing ring of circular cross-section of such a size as to be very slightly larger in diameter than the internal bore of the hub 13, so that it is slightly compressed and prevents the leakage of oil, but is loose enough so that it will turn freely during the time the pin 15 is sheared and relative motion exists between the shafts 11 and the hub 13. Space is provided for the seal 25, in the groove 26 formed around the shaft 11.

By the use of the seal 25, it is possible to have a free fit between the members 11 and 12, between which there is normally no movement so that there is no wear on the member 25. The only time wear occurs is when a pin 15 has sheared and the shaft 11 turns but the gear 12 does not.

I am aware that numerous forms of shear pins have been constructed in the past and I therefore, do not claim such devices broadly, but I do intend to cover such forms and modifications thereof as fall fairly within the appended claim.

I claim:

In a mechanism of the class described, the combination of a driving hub, a driven shaft extending through said hub, said hub and said shaft having diametral aligned holes formed therethrough, a shear pin in said holes of greater length than the diameter of said shaft, a second hole in said shaft communicating with said first hole at an angle between the axis of the shaft and the axis of said first hole, said second hole having a spring urged ball therein adapted to extend partially into said first hole and engage said shear pin, said second hole intercepting the surface of said shaft inside said hub.

RICHARD C. WRIGHT.

REFERENCES CITED

The following references are of record in the file of this patent:

UNITED STATES PATENTS

| Number | Name | Date |
| --- | --- | --- |
| 1,778,477 | Wood | Oct. 14, 1930 |
| 1,849,174 | Carter | Mar. 15, 1932 |
| 1,914,485 | Burton | June 20, 1933 |
| 2,388,186 | Rowsey | Oct. 30, 1945 |
| 2,394,364 | Christensen | Feb. 5, 1946 |
| 2,438,676 | Nickle et al. | Mar. 30, 1948 |

FOREIGN PATENTS

| Number | Country | Date |
| --- | --- | --- |
| 195,524 | Great Britain | 1923 |